United States Patent
Thomasen

(10) Patent No.: US 6,173,805 B1
(45) Date of Patent: Jan. 16, 2001

(54) VARIABLY TUNED VIBRATION ABSORBER

(75) Inventor: Leonard Thomasen, Santa Rosa, CA (US)

(73) Assignee: Tekna Sonic, Inc., Cotati, CA (US)

( * ) Notice: Under 35 U.S.C. 154(b), the term of this patent shall be extended for 0 days.

(21) Appl. No.: 09/257,139

(22) Filed: Feb. 22, 1999

Related U.S. Application Data

(60) Provisional application No. 60/075,666, filed on Feb. 23, 1998.

(51) Int. Cl.[7] ................................. F16F 7/00; F16F 15/00
(52) U.S. Cl. ......................... 181/207; 181/199; 181/208; 181/209
(58) Field of Search ..................................... 181/207, 208, 181/209, 199, 198, 150, 148, 151

(56) References Cited

U.S. PATENT DOCUMENTS

| 4,232,762 | * | 11/1980 | Bschorr | 188/1 B |
|---|---|---|---|---|
| 4,627,635 | * | 12/1986 | Koleda | 280/602 |
| 4,690,244 | * | 9/1987 | Dickie | 181/146 |
| 5,240,221 | * | 8/1993 | Thomasen | 248/559 |
| 5,528,005 | * | 6/1996 | Bschorr et al. | 181/208 |
| 5,550,335 | * | 8/1996 | Ermert et al. | 181/207 |
| 5,583,324 | | 12/1996 | Thomasen . | |
| 5,629,503 | | 5/1997 | Thomasen . | |
| 5,661,271 | * | 8/1997 | Moser | 181/199 |
| 5,691,516 | | 11/1997 | Thomasen . | |

* cited by examiner

Primary Examiner—Robert E. Nappi
Assistant Examiner—Edgardo San Martin
(74) Attorney, Agent, or Firm—Thomas M. Freiburger

(57) ABSTRACT

An in-wall speaker has a variably tuned vibration absorber to absorb and dissipate vibrations in the speaker and surroundings that tend to cause distortions. The vibration absorbing device, including a stack of viscoelastic damping plates, is secured to the speaker or connected structure via a trapezoidally shaped tuning plate, which provides a varying degree of cantilever in different portions of the stack of plates. The effect is to absorb vibrations over a broad range of frequencies.

11 Claims, 6 Drawing Sheets

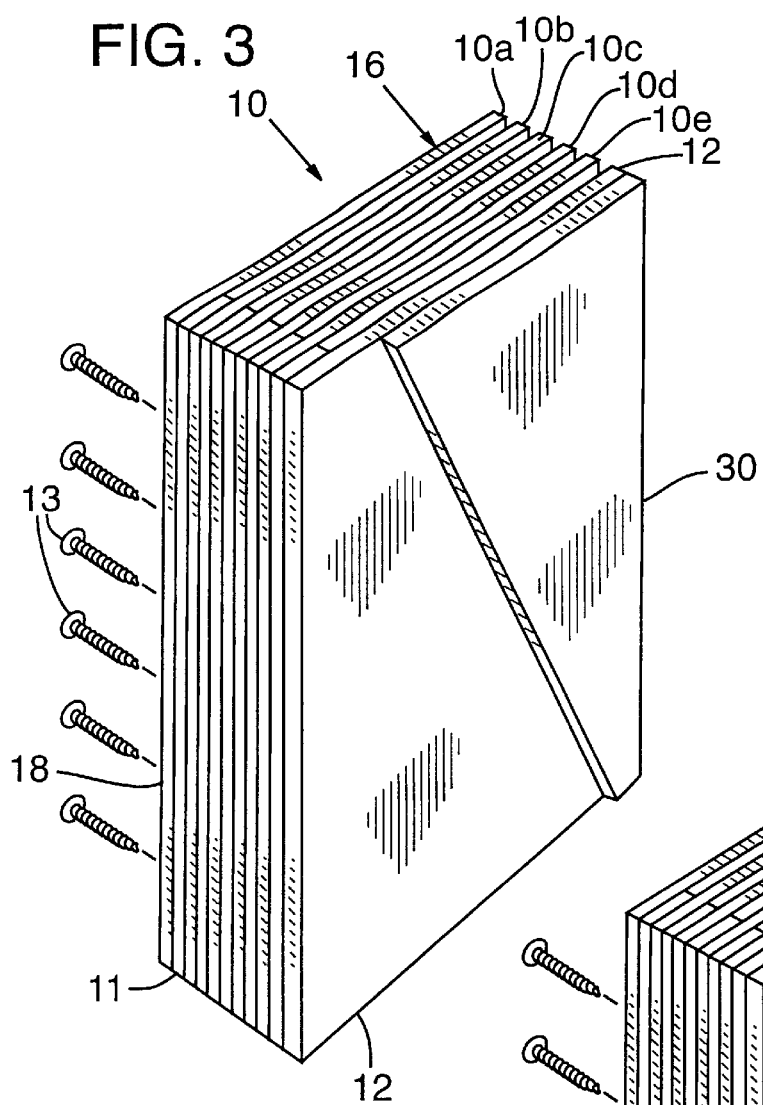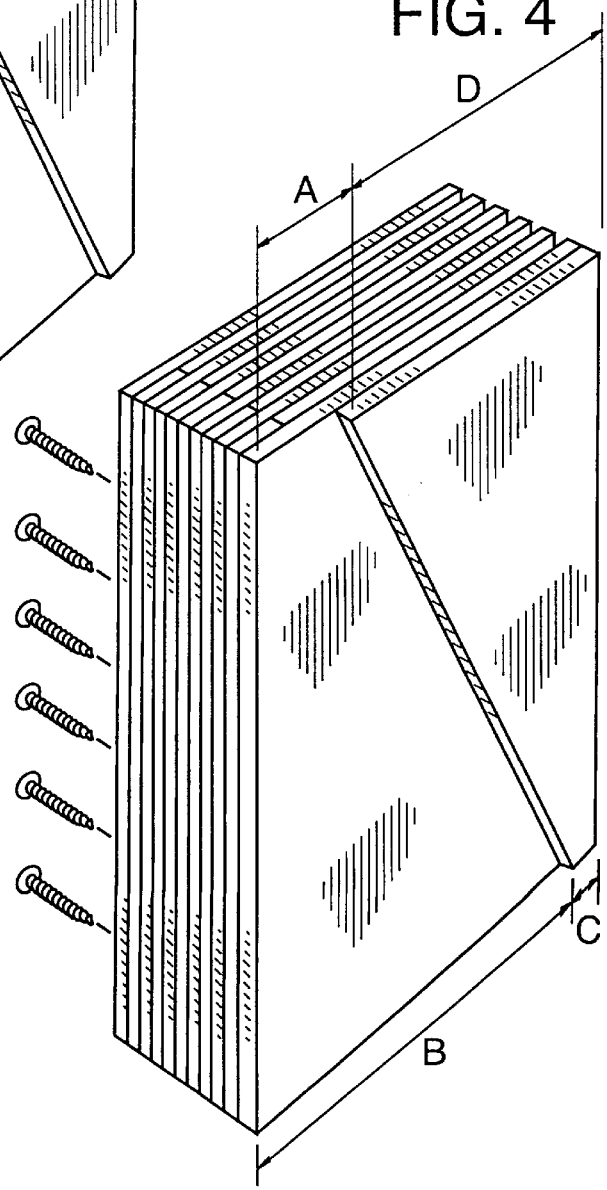

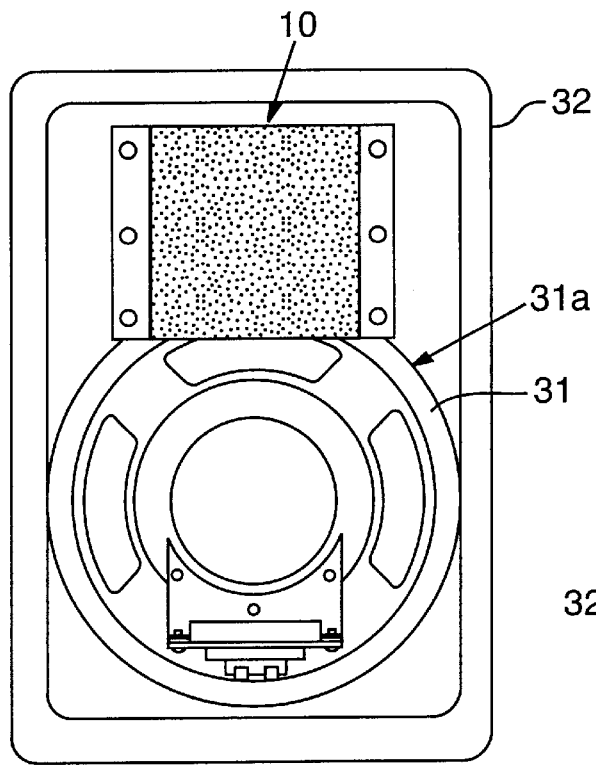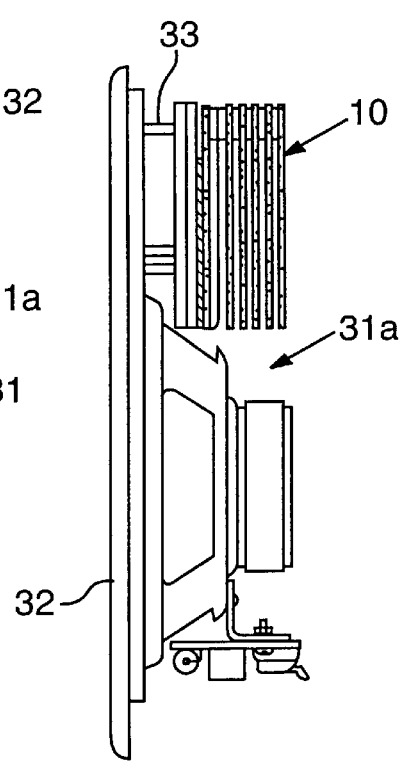
FIG. 9        FIG. 9A
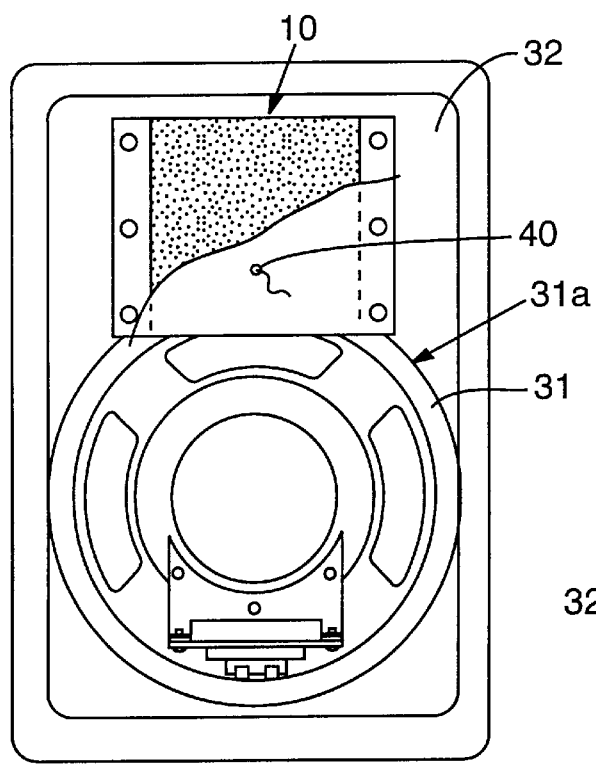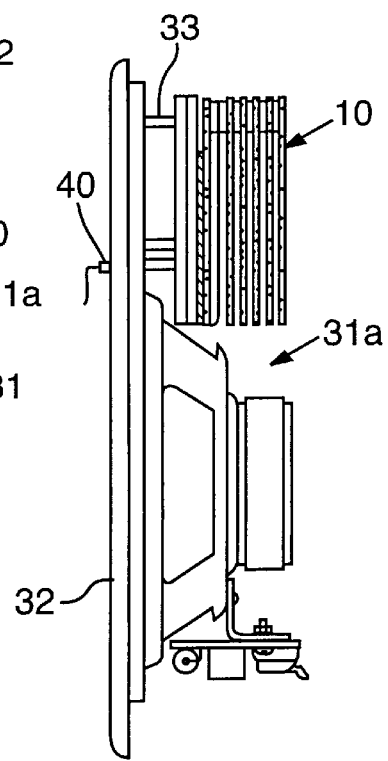
FIG. 10        FIG. 10A

VARIABLY TUNED VIBRATION ABSORBER

This application claims the benefit of provisional application No. 60/075,666 filed Feb. 23, 1998.

BACKGROUND OF THE INVENTION

This application describes an improvement over the disclosure of Patents Nos. 5,583,324 and 5,691,516, an improvement whereby a vibration absorber according to the invention of any of those applications is tunable to a select broad band of continuously varying frequencies upon installation into a speaker cabinet or other speaker enclosure.

In this invention the stack of viscoelastic damping plates, secured together with spacers preferably at one edge, is connected to the speaker panel with an angular shaped tuning mounting plate between the damping unit's base or mounting plate and the speaker panel. As in U.S. Pat. Nos. 5,583,324 and 5,691,516, the stack of plates is secured together and to the unit's mounting plate at one edge, with spacers between plates at the bound edge. Upon installation on the panel of a speaker enclosure, the edge of the unit where all plates are secured together is cantilevered over the edge of the angular shaped tuning mounting plate. The degree of cantilever between the bound edge and the edge of the angular shaped mounting plate varies according to a selected shape and angle such that the unit may be tuned to a select broad band of continuously varying frequencies. The vibration absorbing unit is then fixed to the angular-shaped mounting plate to absorb vibration over the selected broad band of continuously varying frequencies.

It is therefore among the objects of this invention to improve the vibration absorbing capability of vibration damping units such as described in U.S. Pat. Nos. 5,583,324, and 5,691,516 with a simple and efficient procedure. These and other objects, advantages and features of the invention will be apparent from the following description of a preferred embodiment, considered along with the accompanying drawings.

DESCRIPTION OF THE DRAWINGS

FIG. 3 is another perspective view showing the unit of FIG. 1 positioned against an angular shaped mounting plate, for installation of a speaker enclosure.

FIG. 4 is similar to FIG. 3 showing the relative shape and position of the angular shaped mounting plate fixed to the unit of FIG. 1.

FIGS. 9 and 9A show rear and side views of a wall-mounted speaker showing the location where the assembly of FIG. 3 is mounted onto a plastic speaker baffle.

FIGS. 10 and 10A are similar to FIGS. 9 and 9A, showing the location of an accelerometer used to measure the amplitude of vibrations versus frequency in reference to the tuning method of the invention.

DESCRIPTION OF PREFERRED EMBODIMENTS

Figure 1:
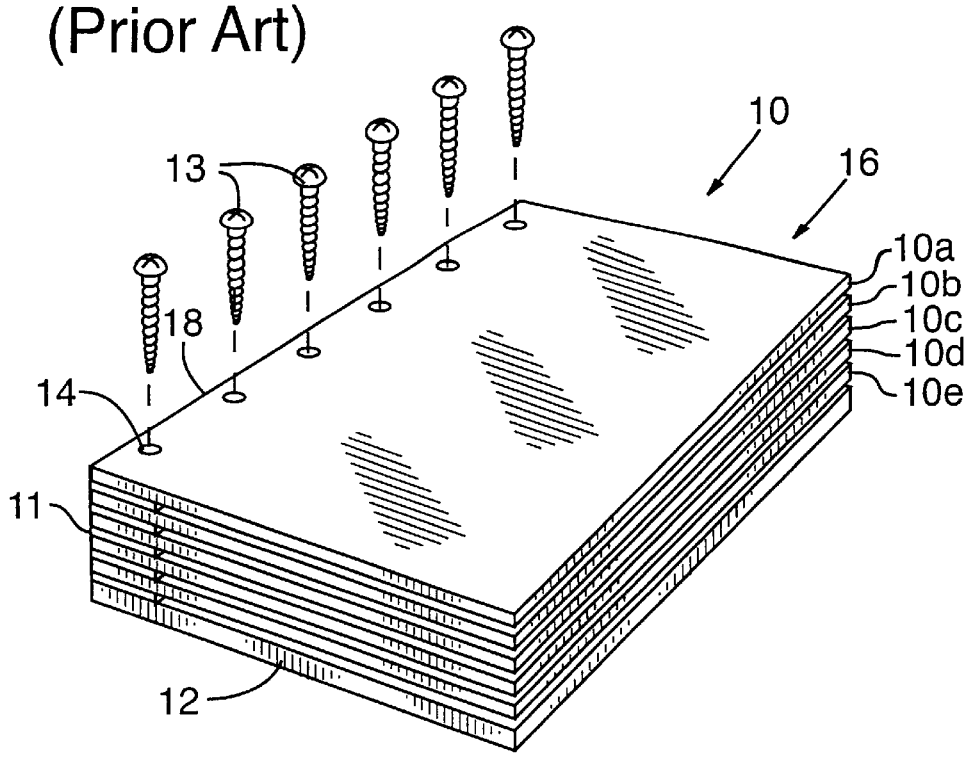
FIG. 1 is a perspective view showing a vibration damping unit with which the procedure and apparatus of the invention may be used.

In the drawings, FIG. 1 shows a vibration damping unit 10 in accordance with U.S. Pat. No. 5,583,324, the disclosure of which is incorporated herein by reference. The damping unit 10 includes a series of vibration damping plates 10a, 10b, 10c, 10d, and 10e (the number of plates can be greater or smaller), secured together and to a mounting plate 12 via spacers 11 and fasteners 13 passing through holes 14 at one edge of the assembly. Outer edges of the damping plates 10a–10e, generally identified by the reference number 16 in FIG. 1, are freely suspended, i.e., cantilevered, the plates and the mounting plate 12 being secured together only at the left edge 18 of the assembly as seen in the drawing. This construction is in accordance with an embodiment described in U.S. Pat. No. 5,583,324 incorporated by reference.

Figure 2:
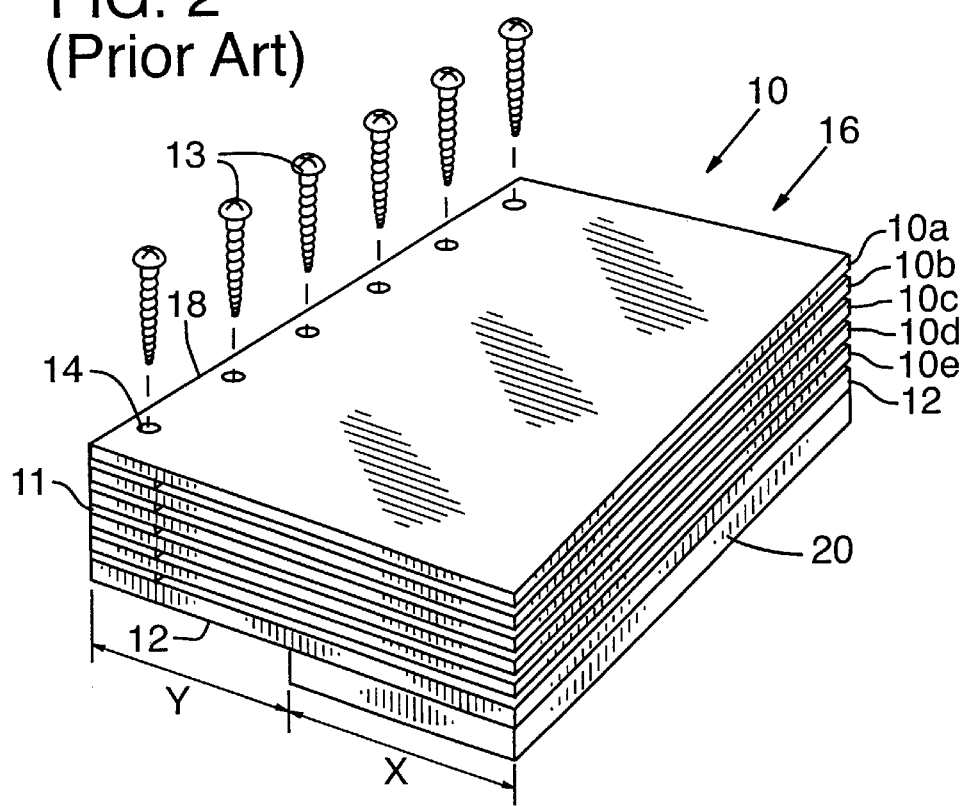
FIG. 2 is a similar view, showing the unit of FIG. 1 positioned against a rectangular shaped mounting plate, for installation on a panel of a speaker enclosure.

FIG. 2 is similar to FIG. 1 but shows the damping unit 10 secured to a separate rectangular mounting plate 20 which serves as a tuning mounting plate for the vibration damping assembly. This construction is in accordance with embodiments described in U.S. Pat. No. 5,691,516, incorporated by reference.

FIG. 3 is similar to FIGS. 1 and 2 but shows the damping unit 10 secured to a separate angular shaped mounting plate 30, preferably triangular or trapezoidal in shape, as shown. The mounting plate 30 serves as a spacer between the unit's mounting plate 12 and a panel of a speaker enclosure (not shown). It can be seen from the drawing in FIG. 3 that the angular shaped mounting plate 30 affects a corresponding angular shaped cantilever area of the region of the unit 10 which is adjacent to the spacers 11, that is, the left edge 18 as seen in the drawing. In FIG. 3, it will also be seen by those skilled in the art that the degree to which the angle of the plate 30 is adjusted relative to the mounting plate 12 causes the cantilevered region of the unit 10 to vary in size across its surface, thus enabling the vibration absorbing unit 10 to resonate over a selected broad band of continuously varying frequencies.

FIG. 4 is similar to FIG. 3 but shows that the cantilever distances A and B are adjusted according to the dimensions assigned to the distances C and D. Thus, the cantilevered area formed on the mounting plate 12 is free to resonate independently from the plates 10a, 10b, etc., which are also free to resonate relative to the secured-together edge 18 of the damping unit. The variable tuning mounting plate or spacer 30, which is preferably made of a one-fourth inch think, high density material such as fiberboard, is bonded securely to the mounting plate 12, which may be accomplished using a solvent such as acetone. Acetone, by its chemical action momentarily melts (liquefies) the surface of the plastic mounting plate 12 thereby causing the mounting plate 12 and the variable tuning mounting plate or spacer 30 to be permanently fused together.

In the assembly as shown in FIG. 4, the variable tuning mounting plate or spacer 30 may be assigned a specific shape or angle relative to the mounting plate 12 by varying the dimensions shown as C and D in FIG. 4, thereby providing the assembly of FIG. 4 with a cantilevered portion described by the dimensions A and B. Varying the dimensions A and B therefore assigns to the structure an infinite series of mass-compliance product factors which, in accordance with the mathematical relationship governing the resonance frequency of a mass-spring system, causes the resonance frequency of the cantilevered portion of the structure of FIG. 4 to vary continuously over a broad band of frequencies.

It will be seen by those skilled in the art that the vibration damping unit 10, shown in FIG. 1, and as in U.S. Pat. No. 5,583,324, forms an integral part of the assemblies of FIG. 2 and FIG. 3 but with two important distinctions: In the assembly of FIG. 2, it is seen that the vibration damping unit 10 incorporates a rectangular spacer plate 20 secured to mounting plate 12. And in the assembly of FIG. 3, it is seen that the vibration damping unit 10 incorporates an angular spacer plate 30 secured to the mounting plate 12. These important distinctions in construction between the assemblies of FIG. 1, FIG. 2, and FIG. 3 are therefore confined to the mounting plate 12 through which mechanical energy propagating in the form of periodic stress transfers from a vibrating body into the assemblies of FIG. 1, FIG. 2, and FIG. 3. Thus, the range and level of vibration damping that can be obtained by the damping unit 10 can be varied by adjusting the spacer means 20 of FIG. 2 and spacer means 30 of FIG. 3, both of which form the means for transferring mechanical energy from a vibrating body into the damping unit 10 of FIG. 1.

Figure 5:
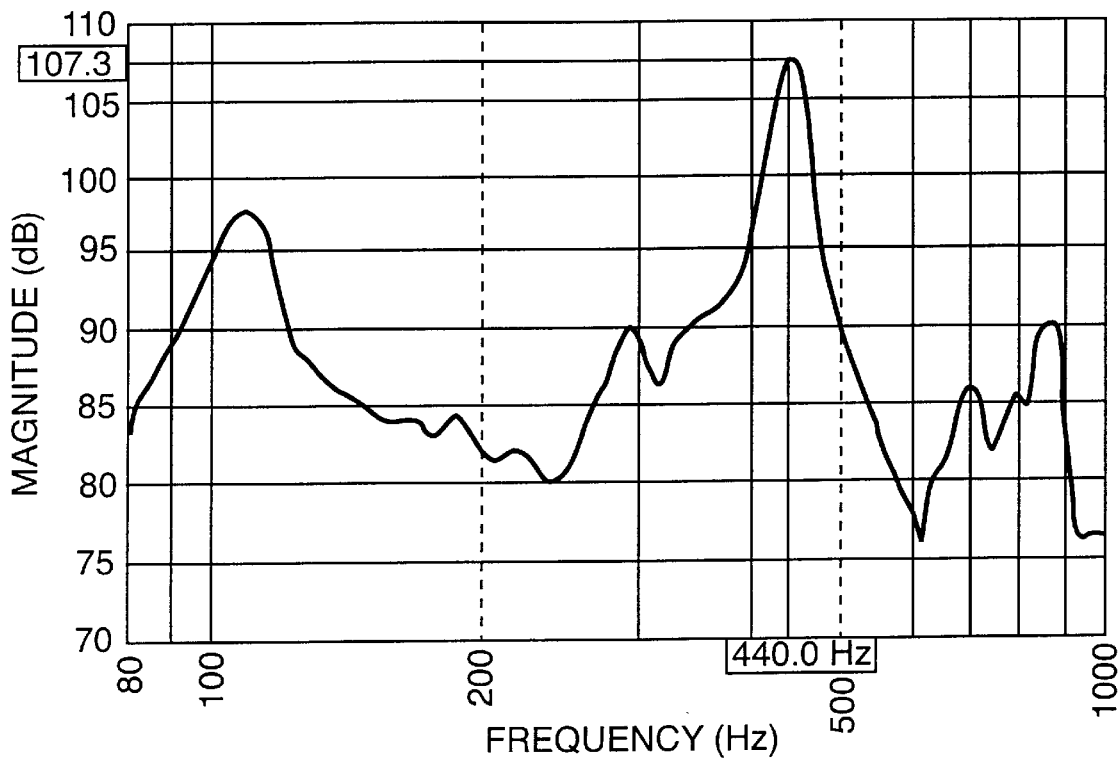
FIGS. 5, 6, 7 and 8 are graphs showing amplitude of vibrations versus frequency, in reference to the tuning method of the invention

For example, the graph in FIG. 5 shows the frequency spectrum from 80Hz to 1000 Hz for a sweep signal applied to a laboratory test panel. The same reference spectrum shown in FIG. 5 was used in plotting the accelerometer-generated graphs shown in FIGS. 6 and 7 showing amplitude of vibrations versus frequency in reference to the vibration attenuating characteristics of the assemblies of FIGS. 2 and 1, respectively.

It can be seen in the assembly of FIG. 1 that the mounting plate 12 does not include a spacer plate and is therefore in full contact with the vibrating panel to which the assembly of FIG. 1 is attached. Therefore, the degree to which the magnitude of vibrations in the panel to which the assembly of FIG. 1 is attached is reduced and the frequencies over which such reduction in panel vibrations occurs is governed solely by modes of transverse vibrations in the series of damping plates 10a, 10b, 10c, 10d and 10e. In reference to the graphs in FIG. 6 and FIG. 8, which show the vibration damping characteristics of the assemblies of FIG. 2 and FIG. 3 respectively, the graph in FIG. 7 shows that the assembly of FIG. 1 is more effective in reducing panel vibration at the higher frequency of 440 Hz than the assembly of FIG. 2. This is due to the larger area of contact that the mounting plate 12 in the assembly of FIG. 1 makes with the vibrating panel to which the assembly is attached, thereby enabling a greater proportion of the higher frequency excitation forces originating in the vibrating panel to transfer into the assembly of FIG. 1 therein exciting into sympathetic resonance the higher frequency overtones which are normally exhibited by modes of transverse vibrations in the damping plates 10a, 10b, 10c, 10d and 10e of the assembly of FIG. 1.

The assembly of FIG. 2, in contrast to the assembly of FIG. 1, includes an intermediate mounting spacer or tuning plate 20 positioned between the mounting plate 12 of the damping unit 10 and the vibrating panel to which the assembly of FIG. 2 is attached. Therefore, it can be seen from the graph in FIG. 6 that the assembly of FIG. 2, by including the intermediate spacer member or tuning mounting plate 20 shown in FIG. 2 is more efficient than the assembly of FIG. 1 in reducing panel vibrations at the lower frequency approximating 110 Hz. By including in the assembly of FIG. 2 the intermediate spacer or tuning mounting plate 20 with the damping unit 10 and adjusting the tuning plate to the dimensions prescribed for a particular selected low frequency as disclosed in U.S. Pat. No. 5,691,516, a cantilevered portion of the damping unit 10 of FIG. 2 is formed which, due to its select tuning, is disposed by its mass-compliance product factor to respond independently of the damping plates 10a, 10b, 10c, 10d and 10e of the assembly of FIG. 2. By vibrating at a selected low frequency which, in this example, is shown in the graph of FIG. 6 to be tuned to vibrate in the vicinity of 110 Hz but which, depending on its intended application, can be varied in accordance with U.S. Pat. No. 5,691,515 to vibrate at any selected low frequency by adjusting the dimensions of the tuning mounting plate 20 in the assembly of FIG. 2.

Figure 6:
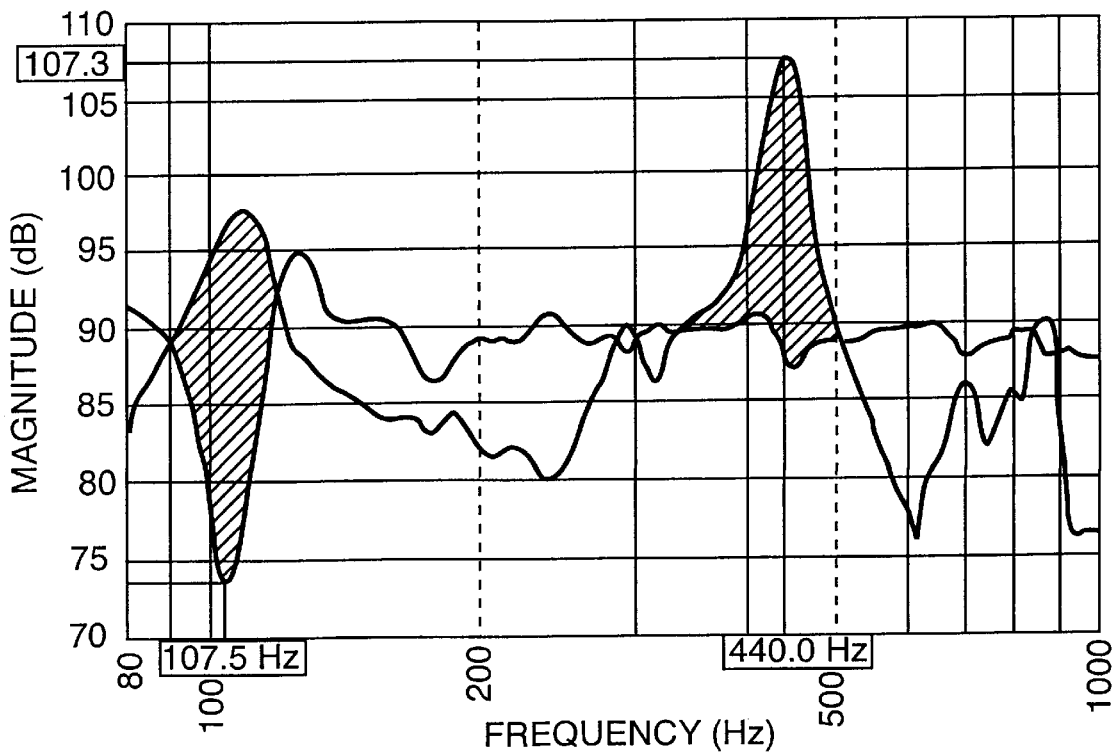
Figure 7:
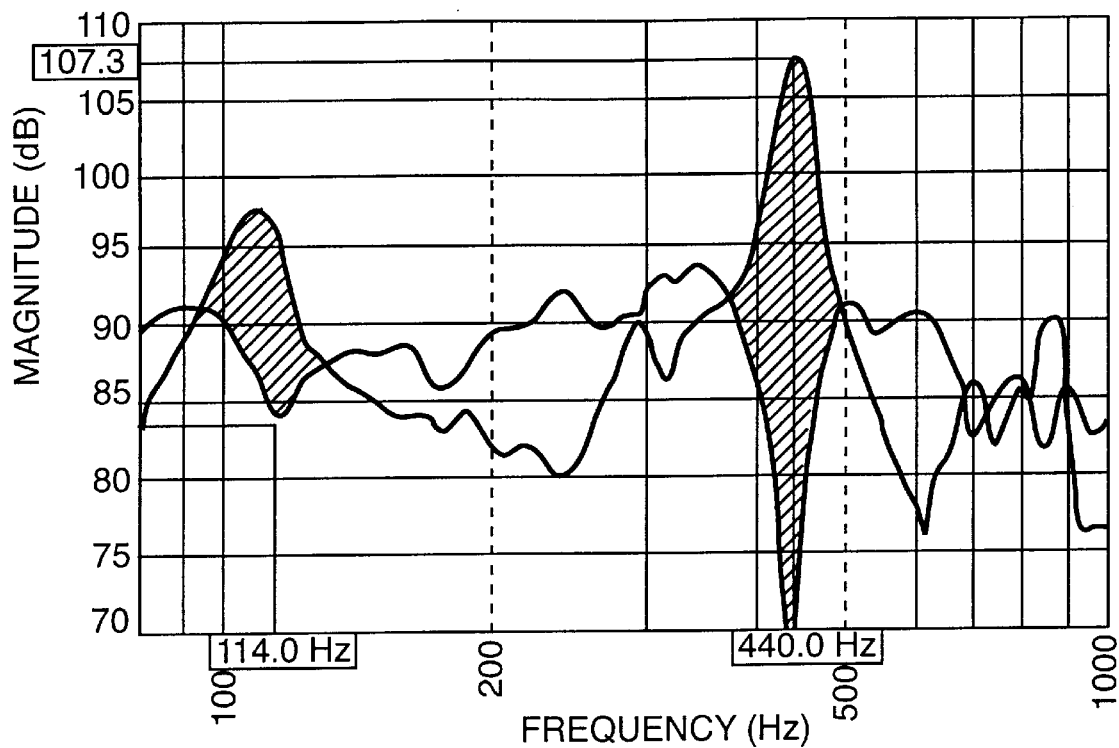

To those skilled in the art to which this invention relates, it will be seen from the graph in FIG. 6 that the damping plates 10a, 10b, 10c, 10d and 10e, acting independently of the cantilevered portion of the assembly of FIG. 2, are not as efficient as they are in the assembly of FIG. 1 in reducing panel vibrations as the frequencies of vibrations rise and which, in this instance, are shown in the graph of FIG. 6 to occur at 440 Hz. As the frequency of vibrations rise, the intermediate mounting or tuning plate 20 of the assembly of FIG. 2, since it provides an area of contact with a vibrating panel to which it is attached that is smaller than the contact area provided by the mounting plate 12 of the damping unit 10, and since it is positioned on the side opposite from side 18 of the damping unit 10, mechanical energy originating in a vibrating panel is prevented from being transferred directly and efficiently into the damping plates 10a, 10b, 10c, 10d and 10e which are shown in FIG. 1 to be secured together at edge 18 and free to vibrate on the other.

The assemblies of FIG. 1 and FIG. 2, as in U.S. Pat. Nos. 5,583,324 and 5,691,516 respectively, have been used extensively to reduce enclose panel resonances in loudspeaker systems that employ rigid enclosures made of such materials as medium density fiberboard. Whenever such loudspeaker systems are in operation, their drive units, in addition to air modes generated within the enclosure, subject the enclosure to periodic or oscillating stress. The resulting strain that is released during each cycle excites the enclosure panels into resonance. The distorted sound from these panel resonances causes response errors in the loudspeaker's sound radiation pattern.

The assembly of FIG. 1 and FIG. 2 are attached to rigid loudspeaker enclosures at locations where panel resonances are found to occur. The assembly of FIG. 1, which does not include a tuning mounting plate 20, and is therefore not tunable to respond efficiently at very low frequencies, is used on enclosure panels to reduce resonances above 200 Hz while the assembly of FIG. 2, which includes a tuning mounting plate 20 and is therefore tunable to respond efficiently at very low frequencies, is typically used on enclosure panels to reduce resonances below 200 Hz.

The assembly of FIG. 3 has been shown to be more effective than either of the assemblies of FIG. 1 or FIG. 2 in reducing panel resonances that occur in loudspeakers which, instead of employing rigid enclosures, are mounted into walls. Such loudspeakers, which are commonly referred to as in-wall speakers, employ thin plastic baffles onto which the loudspeaker's drive units are attached. Whenever such in-wall speakers are in operation, the reaction forces from the drive units combined with air moves within the wall cavity cause the in-wall speaker's thin plastic baffle to resonate at very high magnitude levels. The distorted sound that results from such severe baffle resonances are disturbing to listeners and it would therefore be advantageous to substantially reduce such resonance thereby making the sound from in-wall speakers enjoyable rather than disturbing.

Figure 8:
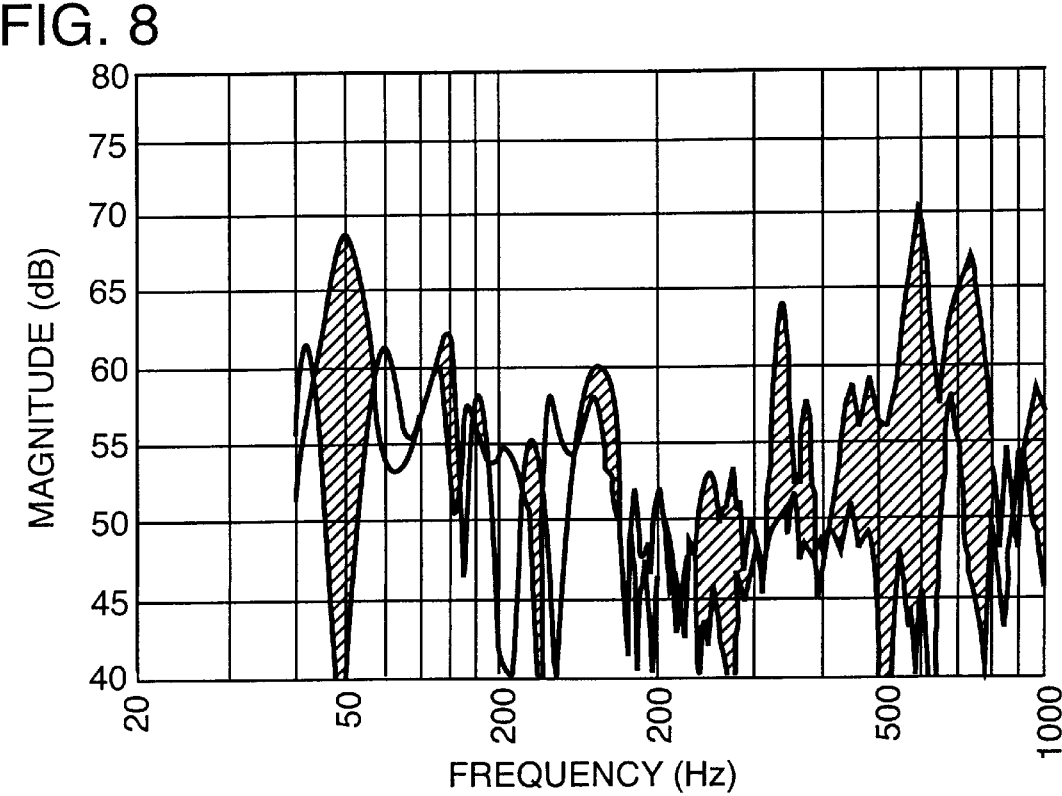

The chart in FIG. 8 shows the extent to which the assembly of FIG. 3 reduces baffle resonances in a typical 8-inch 2-way in-wall speaker. The shaded area of the graph in FIG. 8 shows the absorption of energy by the assembly of FIG. 3 along with the corresponding reduction in baffle resonances measured by an accelerometer positioned immediately above the in-wall speaker's low frequency drive unit as shown in FIGS. 10 and 10A (drive not shown). It will therefore be seen by those skilled in the art that the assembly of FIG. 3, by including the variably tuned angular mounting plate 30, is tunable to respond efficiently, not only at very low frequencies but also at higher frequencies and therefore, when used on the plastic baffles of in-wall speakers, the assembly of FIG. 3 is able substantially to reduce resonances over a broad frequency band extending from the in-wall speaker's fundamental frequency of 50 Hz to 1 KHz as shown by the graph in FIG. 8.

FIGS. 9, 9A show the assembly of FIG. 3 mounted onto the plastic baffle or speaker base 32 at an area located immediately above the low frequency drive unit 31 of the in-wall speaker 31a. The side view elevation in FIG. 9A shows projected plastic stand-off connections 33 which are threaded inside to receive mounting screws for securing the assembly of FIG. 3 to the plastic baffle or speaker base 32.

FIGS. 10, 10A show a rear and side view of a wall-mounted speaker with a cutaway view of the area at the top of the wall-mounted speaker. In both the rear and side view is shown an accelerometer 40 attached to measure the amplitude of vibrations versus frequency in reference to the tuning method of the invention. The location immediately above the cutout hole for mounting the low-frequency drive unit is the location where a plastic in-wall speaker baffle is prone, by its high compliance, to vibrate most energetically and an accelerometer attached at this location measures the magnitude of these vibrations. The graph in FIG. 8 shows the reduction in baffle vibrations measured by the accelerometer attached as shown in FIG. 10.

Figure 11:
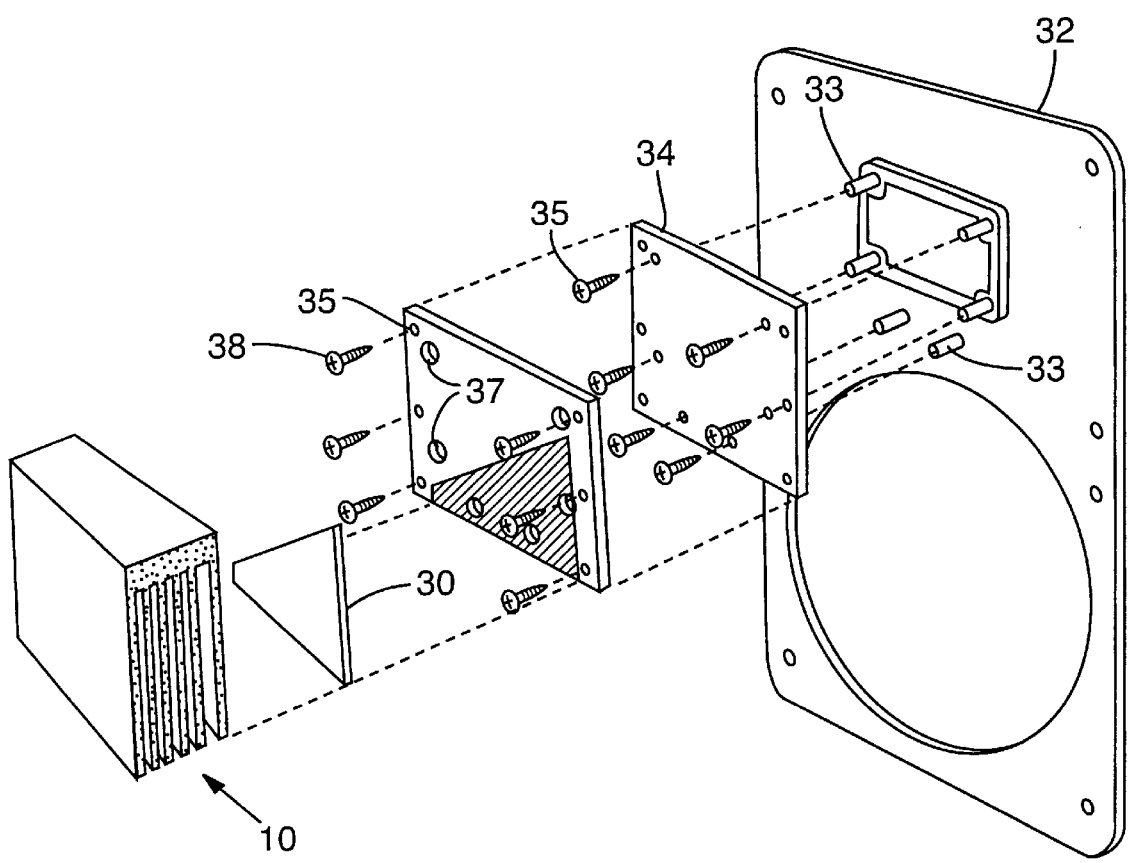
FIG. 11 is a perspective exploded view showing a procedure for mounting the assembly of FIG. 3 onto the plastic baffle of a wall-mounted speaker.

FIG. 11 is a perspective, exploded view showing a procedure for attaching the assembly of FIG. 3 to an in-wall speaker's plastic baffle. The attachment plate 34 is first secured to the threaded projections 33 by means of screws 36. The attachment plate 35 and the angular tuning plate 30 are bonded or fused together with the damping unit 10 to form a monolithic structure. The monolithic structure thus formed is then secured to the attachment plate 34 by means of screws 38 and the screws 36 projected beyond the surface of the attachment plate 34 are free to pass into the holes 37 on attachment plate 35. The completed installation of the assembly of FIG. 3 is shown in FIG. 9.

FIG. 4 is similar to FIG. 3 showing the dimensions A, B, C and D which are adjusted to change the frequency range and the level of magnitude to which the assembly attenuates vibrations in the panel to which the assembly is attached. It is seen by those skilled in the art that reducing the distance C while increasing the distance D broadens the range of frequencies over which the cantilevered portion of the assembly described by dimensions A and B vibrates and that increasing the distance C while reducing the distance D narrows the range of frequencies over which the cantilever portion of the assembly described by dimensions A and B vibrates. The angular shape of the tuning plate 30 relative to the rectangular mounting plate 12 of the assembly is therefore seen to govern the range of continuously varying frequencies of vibrations that the assembly may be assigned to operate over in attenuating vibrations in the panel to which the assembly of FIG. 3 is attached.

The above-described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. A speaker installation with a variably tuned vibration absorber, comprising:

a speaker, an attachment plate connected to the speaker, a vibration attenuating device including a plurality of vibration damping plates arranged in generally stacked, spaced apart formation, with plate securing means for securing the vibration damping plates so as to suspend portions of the vibration damping plates freely in space, the plate securing means comprising edge securing means for suspending at least some of the damping plates from one edge of the plate, leaving opposite edges of the damping plates freely suspended, and including a mounting plate as a base member of the vibration attenuating device, secured to the stack of vibration damping plates by said edge securing means, a tuning plate secured to the mounting plate and to the attachment plate, positioned between the mounting plate and the attachment plate, and the tuning plate having a plurality of edges including an angled edge and being smaller in area than the mounting plate such that a portion of the mounting plate is cantilevered and spaced away from the attachment plate such that, along said one edge of the damping plates and mounting plate, the length of the mounting plate which is cantilevered varies along the length of the one edge due to the angled edge of the tuning plate, whereby the vibration attenuating device is tuned to absorb vibration over a selected broad band of frequencies.

2. The apparatus of claim 1, wherein the tuning plate is trapezoidal in shape, including two parallel edges and a perpendicular edge between, said perpendicular edge being opposite said angled edge and being positioned opposite said one edge of the damping plates with the edge securing means.

3. The apparatus of claim 1, wherein the mounting plate of the vibration attenuating device has two parallel edges each of which is perpendicular to said one edge with the edge securing means, and wherein said angled edge of the tuning plate extends essentially between said two parallel edges of the mounting plate.

4. The apparatus of claim 1, further including a baffle or speaker base to which the speaker is secured, and the attachment plate being secured to the baffle or speaker base.

5. The apparatus of claim 4, including standoff connections secured between the attachment plate and the baffle or speaker base, for spacing the attachment plate outwardly from the baffle or speaker base.

6. The apparatus of claim 4, wherein the baffle or speaker base is of plastic material.

7. The apparatus of claim 1, wherein the tuning plate is secured on the mounting plate at a position spaced away from said one edge of the damping plates having said edge securing means.

8. The apparatus of claim 1, wherein the tuning plate and the mounting plate are both of plastic material, and are fused together by solvent bonding.

9. The apparatus of claim 1, wherein the speaker forms a part of an in-wall speaker installation.

10. The apparatus of claim 1, wherein the vibration damping plates are formed of viscoelastic material.

11. The apparatus of claim 1, wherein the tuning plate has two mutually perpendicular edges obliquely angled relative to the angled edge, and the tuning plate being positioned against the mounting plate such that the mounting plate is cantilevered substantially only at one side of the angled edge of the tuning plate.

* * * * *